United States Patent [19]

Crawford et al.

[11] 4,297,333

[45] Oct. 27, 1981

[54] METHOD OF DECOMPOSING HYPOCHLORITE ION IN A BASIC SOLUTION

[75] Inventors: Roger A. Crawford, Wadsworth; Robert B. Simmons, Norton, both of Ohio

[73] Assignee: PPG Industries, Inc., Pittsburgh, Pa.

[21] Appl. No.: 166,020

[22] Filed: Jul. 7, 1980

[51] Int. Cl.$^3$ .................. B01D 53/34; C01D 3/08; C01B 13/02; C02F 1/72
[52] U.S. Cl. ............................ 423/241; 423/473; 423/499; 423/579; 252/472; 252/466 J; 210/756; 210/763
[58] Field of Search ............... 423/491–499, 423/240, 241, 473, 579; 252/472, 466 J; 210/762, 763, 756

[56] References Cited

U.S. PATENT DOCUMENTS

| | | | |
|---|---|---|---|
| 2,520,181 | 8/1950 | Teter et al. | 252/472 |
| 3,368,982 | 2/1968 | Milbourne | 252/466 J |
| 3,944,487 | 3/1976 | Davis et al. | 210/763 X |
| 3,965,249 | 6/1976 | Kolinosz | 423/497 |
| 4,073,873 | 2/1978 | Caldwell et al. | 423/499 |

FOREIGN PATENT DOCUMENTS 285903  1/1971  U.S.S.R. ..................... 252/472

*Primary Examiner*—Earl C. Thomas
*Attorney, Agent, or Firm*—Richard M. Goldman

[57] ABSTRACT

Disclosed is a hypochlorite decomposition catalyst of nickel (II) oxide and $NiCo_2O_4$ spinel, a hypochlorite destruction process using the catalyst, and a method of synthesizing the catalyst on a porous support.

24 Claims, No Drawings

METHOD OF DECOMPOSING HYPOCHLORITE ION IN A BASIC SOLUTION

DESCRIPTION OF THE INVENTION

Hypochlorite solutions are evolved as effluents and byproducts from various industrial processes, including, e.g., the manufacture of chlorine where the tail gas remaining after a condensation of the chlorine contains air, carbon dioxide, and residual chlorine. The tail gas is scrubbed with an alkaline solution, for example, aqueous sodium hydroxide, aqueous sodium hydroxide and sodium chloride, aqueous potassium hydroxide, or aqueous potassium hydroxide and potassium chloride. The liquid product resulting therefrom contains hypochlorite ion.

Aqueous hypochlorite ion solutions are destructive of various industrial metals as well as being toxic to marine life. It is therefore necessary to destroy hypochlorite ion. Methods of destroying hypochlorite ion include thermal decomposition, ultraviolet light, or reaction with other reagents. A still further method of destruction of hypochlorite ion is the transition metal oxide surface catalyzed destruction thereof. One transition metal oxide method utilizes cobalt oxide spinel, $Co_3O_4$, as described in U.S. Pat. No. 4,073,873 to Caldwell et al for Catalytic Decomposition of Hypochlorite.

It has now been found that a particularly desirable transition metal oxide surface catalyzed method of hypochlorite ion decomposition is through the use of a solid composition of nickel (II) oxide and bimetal nickel cobalt spinel, $NiCo_2O_4$.

According to the method herein comtemplated, aqueous hypochlorite ion is catalytically decomposed into oxygen molecules and chloride ions by contacting the solution with a hypochlorite decomposition catalyst that is a solid comprising nickel (II) oxide and bimetallic nickel cobalt spinel, $NiCo_2O_4$.

According to a further exemplification of the invention, there is disclosed a method preparing a hypochlorite decomposition catalyst by providing a composition of not more than two (2) parts of a spinel-forming compound of cobalt and at least one (1) part of a spinel-forming compound of nickel on an inert substrate, and thereafter heating the composition and the substrate under spinel-forming conditions. In this way there is formed a solid composition of nickel (II) oxide and nickel cobalt spinel, $NiCo_2O_4$.

According to a further exemplification of the invention, there is provided a hypochlorite decomposition catalyst comprising an inert substrate having an active surface material, which active surface material comprises nickel (II) oxide and nickel cobalt bimetal spinel, $NiCo_2O_4$, where the active surface material has a unique X-ray diffraction pattern.

According to a still further exemplification of this invention, there is provided a method of removing chlorine from chlorine-containing gas by contacting the gas with an aqueous alkaline solution, whereby to form hypochlorite ion within the solution, and thereafter contacting the hypochlorite ion containing solution with a solid catalyst of nickel (II) oxide and nickel cobalt bimetal spinel, $NiCo_2O_4$, whereby to decompose the hypochlorite ion into chloride ion and oxygen molecules.

DETAILED DESCRIPTION OF THE INVENTION

It has now been found that a hypochlorite decomposition catalyst particularly useful in the decomposition of aqueous hypochlorite ion in solution is a mixed oxide compound of nickel (II) oxide and the bimetal nickel cobalt spinel $NiCo_2O_4$. The hypochlorite decomposition catalyst may be characterized both by its method of synthesis and by the X-ray diffraction pattern thereof.

The hypochlorite decomposition catalyst herein contemplated has a unique X-ray diffraction pattern. This diffraction pattern arises from its crystal structure. The spinel crystal structure and the methods of identifying it by X-ray diffraction techniques are well known in the literature. For example, the spinel crystal structure is discussed in Wyckoff, *Crystal Structure*, Volume 3 (2 ed.), Wiley and Sons, New York (1963), at pages 75–86; in Wells, *Structural Inorganic Chemistry*, Oxford University Press, New York (1950), at pages 379–388; in Evans, *An Introduction to Crystal Chemistry*, (2 ed.), Cambridge University Press, New York (1966), at pages 171–175; and in Bragg, Claringbull, and Taylor, *The Crystalline State*, Volume 4: "Crystal Structures of Minerals", G. Bell and Sons Ltd., London (1965), at pages 102–106.

As described therein, the spinel crystal structure is a structure of oxygen atoms in an approximately cubic, close-packed relationship with the metal ions lying in holes of the packing. The spinel crystal structure may further be characterized in that one-third of the metal ions have four oxygen neighbors, which oxygen neighbors are arranged tetrahedrally to the metal ion and that two-thirds of the metal ions have six oxygen neighbors, which oxygen neighbors are arranged octahedrally to the metal ion.

In the crystal structure herein contemplated, the nickel ions have four oxygen neighbors, which oxygen neighbors are arranged tetrahedrally to the nickel ion, and the cobalt ions have six oxygen neighbors, which oxygen neighbors are arranged octahedrally to the cobalt ion.

Each of the layers of close-packed oxygen ions contain diagonal chains of metal ions having octahedral geometry. The octahedral metal ions that is, the cobalt ions, are linked laterally above and below the layer of oxygen atoms by the metal ions having tetrahedral geometry, that is, by the nickel ions. The direction of the chains in any layer is normal for the direction of chains in the adjacent layer, with four layers making up a unit cell.

The unit cell is an arbitrary parallelopiped, which is the smallest repetitive unit identifiable as the crystal. The unit cell conforms to the symmetry of the system to which the crystal belongs and is defined by the lengths of its edges and the angles included behind them. The spinel unit cell contains eight formula weights, that is, eight units of $NiCo_2O_4$. More particularly, the nickel cobalt spinel crystallographic unit cell contains 32 oxygen atoms with equivalent positions in the cell for eight nickel ions surrounded tetrahedrally by four oxygen ions and for 16 cobalt ions surrounded octahedrally by 6 oxygen ions.

The nickel cobalt spinel crystallographic unit gives an unique X-ray diffraction pattern corresponding to the spaces between the crystallographic planes. The observation of the X-ray diffraction pattern requires subjecting samples of the hypochlorite decomposition catalyst to X-rays from a copper target. This is accomplished as described in, e.g., Chapter 5 of Klug and Alexander, *X-Ray Diffraction Procedures,* John Wiley and Sons, Inc., New York (1954), at pages 235–318, especially pages 270–318; and in Newfield, *X-Ray Diffraction Methods,* John Wiley and Sons, Inc. New York (1966) at pages 177–207.

As described in these texts, X-rays have a wavelength of 1.5405 Angstrom units. The X-rays diffracted by the sample are particularly intense at certain angles, theta, resulting in peaks on diffractometer printouts or in lines on photographic diffraction patterns. The high intensity peaks are caused by the X-rays being reflected from parallel planes in the crystal and reinforcing each other.

The wavelength of the X-rays, the spacing of the planes in the crystal, and the angle, theta, are related by Bragg's Law:

$$2d \sin \theta = n\lambda$$

where d is the distance between planes of the crystal and is an integer; $\lambda$, lambdu is the wavelenth of the X-rays; and $\theta$ is the angle of incidence of the X-rays, as well as the angle of reflection of the X-rays.

The X-ray diffraction data is obtained from a diffractometer that is direct reading in two theta, wherein 180° minus two theta is the angle between the incident ray and the reflected ray.

The hypochlorite decomposition catalyst of this invention is characterized by a bimodal X-ray diffraction peak at 36.60° two theta and 37.15° two theta. This corresponds to interplanar spacings of 2.44 and 2.42 Angstroms respectively. The peak at 36.60° two theta should be about 200 percent of the peak at 37.15° two theta and generally from about 100 percent to about 400 percent of the peak at 37.15° two theta. The resolution of the $NiCo_2O_4$ peak at 2.447 Angstroms into two peaks is a characteristic of the catalyst material contemplated herein. Other x-ray diffraction characteristics of the catalyst contemplated herein are the absence of the $NiCo_2O_4$ peaks, i.e., the undetectability thereof, at 2.029 Angstroms, 1.372 Angstroms, 1.136 Angstroms, and 1.084 Angstroms, and the shifting of the small peaks from 1.230 and 1.171 Angstroms to 1.225 and 1.125 Angstroms, respectively.

The hypochlorite decomposition catalyst herein contemplated is prepared by reacting a spinel-forming nickel compound with a spinel-forming cobalt compound where the nickel compound is in stoichiometric excess, that is, with more nickel compound than is needed to form nickel cobalt spinel, $NiCo_2O_4$. In this way, there is simultaneously formed both nickel (II) oxide and nickel cobalt spinel, $NiCo_2O_4$. The spinel-forming materials are reacted together under conditions which form spinels, that is by thermal decomposition to form the oxide and spinel.

The spinel-forming compounds may be inorganic salts such as nitrides, chlorides, sulfates, or the like, or organic salts such as oxalates, stearates, resinates, or other fatty acid esters of nickel and cobalt. The nickel and cobalt compounds may be mixed together as solids, as crystalline solids, as liquid compositions either in alcohol solution, organic acid solution, inorganic acid solution, ketone solution, or the like.

The spinel-forming compounds are then reacted under conditions that produce the spinel structure, e.g., at a temperature of above about 250° Centigrade and generally from about 400° Centigrade to about 800° Centigrade in an oxygen-containing atmosphere, such as air, whereby to form the nickel cobalt spinel and nickel (II) oxide.

The amount of nickel present, relative to the amount of cobalt present, is at least enough that all of the cobalt is present as Co(III) in the spinel $NiCo_2O_4$, and none is left to from the spinel $Co_3O_4$, and there is sufficient excess nickel to form NiO. That is, there is more than one part of nickel per two parts of cobalt i.e., at least, a 50 percent excess of nickel to form 0.5 parts of nickel (II) oxide per part of $NiCo_2O_4$, and preferably about two parts of nickel to two parts of cobalt, although there should be sufficient cobalt to form the $NiCo_2O_4$ spinel, and a sufficient amount of nickel to form both the $NiCo_2O_4$ spinel, and the Ni(II) oxide, without destroying the spinel structure, and to avoid formation of $Co_3O_4$ and NiO, and avoiding formation of $Co_3O_4$, it is meant that sufficient $NiCo_2O_4$ and NiO are formed to be detected by X-ray diffraction, and that $Co_3O_4$ is not detectable by X-ray diffraction.

The spinel-forming salts, as described above, are added to the solvent, for example, at the solubility limits thereof, whereby to form a liquid composition. According to one exemplification the hypochlorite decomposition catalysts may be formed on ceramic ware, that is, without being either drawn into or on the surface of a catalyst substrate. In this way the catalyst is formed as a fine particulate or crystalline material. Alternatively, the precursors, i.e., the spinel-forming compounds, may be drawn into or onto the carrier or substrate, for example, by vacuum, as by drawing through a bed of the substrate or support material under vacuum.

Thereafter, the spinel-forming materials are heated under conditions to decompose the salt and form the oxide. In this way, there is provided a catalyst material of nickel (II) oxide and nickel cobalt spinel $NiCo_2O_4$. The catalyst may be a crystalline material or an intimate mixture of two crystals, exhibiting the X-ray diffraction pattern of nickel (II) oxide and nickel cobalt spinel, $NiCo_2O_4$, as described above.

According to one particularly desirable exemplification of this invention, the hypochlorite decomposition catalyst, that is, the composition of nickel (II) oxide and nickel cobalt spinel is supported on a substrate. By substrate, i.e., a catalyst carrier, is meant a material that preferably has some degree of porosity, and sufficient bulk strength to avoid fracture in use. The substrate may be in the form of pellets, tablets, rings, saddles, or other shapes.

The substrate or catalyst carrier is sufficiently inert to avoid dissolution in the alkaline hypochlorite solution and should have a crush strength above 10 pounds per square inch and preferably above 20 pounds per square inch.

Suitable hypochlorite decomposition catalyst carriers or substrates include refractory oxides such as alumina, titania, quartz, silica, or the like. Especially preferred is alpha-alumina.

Alpha-alumina is characterized by a surface area of from 3 to 5 square meters per gram, a water pore volume in excess of 0.25 cubic centimeters per gram, and a crush strength of above 13 pounds per square inch with 80 percent having a crush strength of 15 to 50 pounds per square inch.

The hypochlorite decomposition catalyst as described and prepared hereinabove may be used to remove chlorine from chlorine-containing gases, i.e., tail gas. Tail gas is the gas remaining after passage of electrolytic chlorine gas through a compressor-condensor train and contains air, that is, oxygen and nitrogen, as well as chlorine and carbon dioxide. The tail gas is scrubbed to remove the chlorine. Scrubbing may be with an aqueous alkaline solution such as cell liquor, that is, aqueous sodium hydroxide, aqueous sodium hydroxide and sodium chloride, aqueous potassium hydroxide, or aqueous potassium hydroxide and potassium chloride. Scrubbing forms an aqueous alkali metal hypochlorite solution containing from about 20 to about 200 grams per liter of alkali metal hypochlorite and generally from about 25 to about 150 grams per liter thereof. The resulting solution contains alkali metal ion, chloride ion, hypochlorite ion, hydroxyl ion, hydrogen ion, carbonate ion, and has a pH of from about 8 to 14 and generally from about 12 to 13. The hypochlorite decomposition catalyst as described and prepared hereinabove may be utilized to decompose hypochlorous acid.

The hypochlorite ion, formed by scrubbing the chlorine solution with the aqueous alkali solution, is removed from the resulting solution by contacting the solution with the hypochlorite decompositon catalysts described herein. In this way, there is formed oxygen and chloride ion.

The hypochorite ion concentration of the streams treated by the catalyst of this invention and the method described herein is generally above about 2.0 weight percent, i.e. from about 2.5 to abut 20 weight percent hypochlorite in the feed, with from about 50 percent of the hypochlorite to about 98 percent of the hypochlorite being decomposed, i.e., to provide an effluent of from about 0.05 to about 0.3 weight percent hypochlorite. The reduction in hypochlorite content of the stream is from about 50 percent to about 98 percent.

According to one particularly desirable exemplification of the method of this invention, nickel nitrate, Ni(NO$_3$)$_2 \times$ 6H$_2$O, and cobalt nitrate, Co(NO$_3$)$_2 \times$ 6H$_2$O, is prepared by adding the salts to water up to the solubility limits thereof. The cobalt nitrate solution and nickel nitrate solution are then mixed together in equimolar quantities thereof. Thereafter, an alpha-alumina substrate in the form of 3 millimeter by 3 millimeter pellets having a surface area of from 3 to 5 square meters per gram, a loose-packed density of about 1.3 to 1.5 grams per cubic centimeter, and a loose-packed void volume of from about 0.25 to about 0.35 cubic centimeters per gram is wetted with and tumbled in the nickel nitrate-cobalt nitrate solution.

Thereafter, the solution-coated pellets are dried by evaporation and then heated to about 400 degrees Centigrade for about 1 hour in air, whereby to provide alpha-alumina pellets containing approximately 3 to 5 weight percent spinel catalyst.

The catalyst-coated alpha-alumina particles are then placed in a packed bed.

Meanwhile, the chlorine stream from an electrolysis plant is passed through a compressor-condensor train, whereby to liquefy the chlorine. The tail gas of noncondensables, i.e., nitrogen, oxygen, carbon dioxide, and from traces to about 60 volume percent chlorine is scrubbed with a cell liquor containing approximately 125 grams per liter of sodium hydroxide and 175 grams per liter of sodium chloride. The effluent from the scrubber contains approximately 20 to 50 grams per liter of sodium hypochlorite. The sodium hypochlorite-containing solution is passed to the packed bed and a hypochlorite solution containing about 0.05 to 0.3 weight percent hypochlorite ion is recovered therefrom.

The following example is illustrative of the method of this invention.

EXAMPLE

A series of hypochlorite decomposition catalyst formulations were prepared and tested. The catalysts were nickel cobalt spinel, cobal spinel, and nickel (II) oxide-nickel cobalt spinel. All of the formulations were on alpha-alumina substrates.

Solutions of Ni(NO$_3$)$_2 \times$ 6H$_2$O and Co(NO$_3$)$_2 \times$ 6H$_2$O were prepared by adding the respective salt to water up to its solubility limit. The cobalt nitrate solution had a density of 1.28 grams per cubic centimeter, and contained 2.0 moles of cobalt per liter. The nickel nitrate solution had a density of 1.28 grams per cubic centimeter, and contained 2 moles of cobalt per liter.

The alpha-alumina substrate was in the form of 3 millimeter by 3 millimeter pellets having a surface area of 3.8 square meters per gram, a loose-packed density of 1.368 grams per cubic centimeter, and a loose-packed void volume of 0.309 cubic centimeters per gram.

Two hundred and fifty grams of the alpha-alumina pellets were poured into a 0.5 gallon wide mouth plastic bottle, and 110 grams of the nickel nitrate-cobalt nitrate solution described in Table I was added to the pellets. The pellets were tumbled in the bottle until all of the solution was soaked into the pellets.

Thereafter, the solution saturated and coated pellets were transferred to a Teflon ® polytetrafluoroethylene coated PYREX ® dish and heated to 110° Centigrade for one hour. The dried pellets were then heated from 23° Centigrade to 400° Centigrade over 30 minutes, and maintained at 400° Centigrade in air for one hour. The resulting pellets contained approximately 4.0 weight percent spinel catalyst, as shown in Table I.

The catalyst coated alpha-alumina pellets (212.3 grams) were placed in a 0.76 inch (1.93 centimeter) diameter reactor to a bed depth of about 24 inches (61.0 centimeters). A synthetic hypochlorite solution was prepared containing 280.5 milliliters of 325 grams per liter sodium chloride, 3.5 grams of sodium hydroxide, 144 milliliters of 15 weight percent NaOCl, and water to make one liter. The solution had a pH of 12.8.

The test was started by bottom feeding sufficient hypochlorite solution to fill the reactor, and thereafter circulating the hypochlorite through the reactor at the rate of 6.8 milliliters per minute.

The value of K, the rate constant, was calculated by multiple regression analysis of the time, t, in hours, and the product of (solution volume/void volume)$\times$ln (NaOCl concentration), where NaOCl is the concentration in the concentration at time t.

The solution volume was 1000 milliliters. The void volume is the void volume of the catalyst bed, i.e., 130.6 cubic centimeters.

The results obtained are shown in Table I below.

TABLE I

| Run Number | A | B | C | D |
|---|---|---|---|---|
| Preparation of Catalyst: | | | | |
| Grams of 2 Molar Ni(NO$_3$)$_2$ | | | | |

TABLE I-continued

| Run Number | A | B | C | D |
|---|---|---|---|---|
| solution | 50 | 75 | 100 | — |
| Grams of 2 Molar Co(NO$_3$)$_2$ solution | 100 | 75 | 50 | 50 |
| Water | — | — | — | 78.1 |
| Grams of solution prepared | 150 | 150 | 150 | 128.1 |
| Grams of solution added to pellets | 110 | 110 | 110 | 93.4 |
| Grams of alfa-alumina particles | 250 | 250 | 250 | 250 |
| Catalyst: | | | | |
| Ni (weight percent) | 1.36 | 2.02 | 2.68 | 0.00 |
| Co (weight percent) | 2.68 | 2.02 | 1.36 | 1.36 |
| Crystalline Components by X-ray diffraction | NiCo$_2$O$_4$ | NiO + NiCo$_2$O$_4$ | NiO + NiCo$_2$O$_4$ | Co$_3$O$_4$ |
| Mole ration NiO to NiCo$_2$O$_4$ | — | 2:3 | 3:2 | — |
| Initial NaOCl (gm/liter) | 24.9 | 24.86 | 24.94 | 24.90 |
| Final NaOCl (gm/liter) | 8.14 | 6.76 | 5.98 | 6.17 |
| Reaction time (minutes) | 180 | 180 | 180 | 180 |
| K$_1$ rate constant (hr$^{-1}$) | 2.910 | 3.438 | 3.739 | 3.519 |
| Residence time for 50% decomposition assuming first order kinetics (minutes) | 14.29 | 12.09 | 11.12 | 11.82 |

A neat formulation, i.e., without alumina pellets, was prepared utilizing the procedure of Sample C. This sample was subjected to X-ray diffraction analysis. It had a bimodal peak at 36.60 degrees two theta (2.44 Angstroms) and 37.15 degrees two theta (2.42 Angstroms), the one at 36.60 degrees two theta being higher than the one at 37.15 degrees two theta. Other peaks were observed at 1.435 Angstroms, 1.563 Angstroms, 1.057 Angstroms, and 2.867 Angstroms. Moreover, the peaks expected to be found at 2.029 Angstroms, 1.372 Angstroms, 1.136 Angstroms, and 1.084 Angstroms were not detected. This evidenced the presence of both NiCo$_2$O$_4$ bimetal spinel and nickel (II) oxide.

Although the invention has been described in terms of specific details, exemplifications, and embodiments, the description is not intended to limit the invention, the scope of which is defined in the appended claims.

We claim:

1. In a method of catalytically decomposing aqueous hypochlorite into oxygen and chloride, which method comprises contacting the aqueous hypochlorite solution with a hypochlorite decomposition catalyst, the improvement wherein said hypochlorite decomposition catalyst is a solid comprising nickel (II) oxide and bimetal NiCo$_2$O$_4$ spinel.

2. The method of claim 1 wherein the hypochlorite decomposition catalyst is prepared by heating spinel-forming nickel compounds and spinel-forming cobalt compounds under spinel-forming conditions in the presence of an excess of the nickel compound, basis amount required to stoichiometrically react with the cobalt compound to form NiCo$_2$O$_4$ spinel.

3. The method of claim 2 wherein the hypochlorite decompostion catalyst is on an inert carrier, and the catalyst is formed in situ on the carrier.

4. The method of claim 3 wherein the inert carrier is alpha-alumina.

5. The method of claim 2 wherein the nickel compound is present in at least 50 percent excess, basis amount required to stoichiometrically react with the cobalt compound to form NiCo$_2$O$_4$ spinel.

6. The method of claim 2 wherein the hypochlorite decomposition catalyst has a bimodal X-ray diffraction peak at 36.60 degrees two theta and 37.15 degrees two theta.

7. The method of claim 1 wherein the hypochlorite is chosen from the group consisting of hypochlorous acid, and alkali metal hypochlorite.

8. A method of preparing a hypochlorite decomposition catalyst comprising providing a composition containing not more than 2 parts of a spinel-forming compound of cobalt and more than 1 part of a spinel-forming compound of nickel on an inert substrate, heating the composition and substrate under spinel-forming conditions whereby to form nickel (II) oxide and NiCo$_2$O$_4$ spinel on the inert substrate, and recovering an inert substrate having a surface thereon comprising nickel (II) oxide and NiCo$_2$O$_4$ with a bimodal X-ray diffraction pattern at 36.60 degrees two theta and 37.15 degrees two theta.

9. The method of claim 8 wherein the composition contains at least 1.5 parts of the spinel-forming compound of nickel.

10. The method of claim 8 wherein the spinel-forming compounds of nickel and cobalt are chosen from the group consisting of carbonates, nitrates, sulfites, formites, oxalates, and fatty acid esters of nickel and cobalt.

11. The method of claim 8 wherein the inert substrate is alpha-alumina.

12. A hypochlorite decomposition catalyst comprising an inert substrate having an active surface material, said active surface material comprising nickel (II) oxide and NiCo$_2$O$_4$ bimetal spinel, said active surface material having a bimodal X-ray diffraction peak at 36.60 degrees two theta and 37.15 degrees two theta.

13. The hypochlorite decomposition catalyst of claim 13 wherein the active surface contains more than 0.5 parts of nickel (II) oxide per part of NiCo$_2$O$_4$ spinel.

14. The hypochlorite decomposition catalyst of claim 13 prepared by the method comprising a composition not more than 2 parts of a spinel-forming compound of cobalt and more than 1 parts of a spinel-forming compound of nickel on an inert substrate, and heating the composition and substrate under spinel-forming conditions whereby to form nickel (II) oxide and $NiCo_2O_4$ spinel.

15. The hypochlorite decomposition catalyst of claim 14 wherein the composition contains at least 1.5 parts of the spinel-forming compound of nickel.

16. The hypochlorite decomposition catalyst of claim 14 wherein the spinel-forming compounds of nickel and cobalt are chosen from the group consisting of carbonates, nitrites, sulfites, formites, oxalates, and fatty acid esters of nickel and cobalt.

17. The hypochlorite decomposition catalyst of claim 12 wherein the inert substrate is alpha-alumina.

18. In a method of removing chlorine from a gas stream comprising scrubbing the gas stream with an aqueous alkaline solution, and thereafter contacting the resulting solution with a solid hypochlorite decomposition catalyst, whereby to form oxygen molecules and chloride ion, the improvement wherein said hypochlorite decomposition catalyst is a solid comprising nickel (II) oxide and bimetal $NiCo_2O_4$ spinel.

19. The method of claim 18 wherein the hypochlorite decomposition catalyst is prepared by heating spinel-forming nickel compounds and spinel-forming cobalt compounds under spinel-forming conditions in the presence of an excess of the nickel compound, basis amount required to stoichiometrically react with the cobalt compound to form $NiCo_2O_4$ spinel.

20. The method of claim 19 wherein the hypochlorite decomposition catalyst is on an inert carrier, and the catalyst is formed in situ on the carrier.

21. The method of claim 20 wherein the inert carrier is alpha-alumina.

22. The method of claim 19 wherein the nickel compound is present in at least 50 percent excess, basis amount required to stoichiometrically react with the cobalt compound to form $NiCo_2O_4$ spinel.

23. The method of claim 19 wherein the hypochlorite decomposition catalyst has a bimodal X-ray diffraction peak at 36.60 degrees two theta and 37.15 degrees two theta.

24. The method of claim 18 wherein the hypochlorite is chosen from the group consisting of hypochlorous acid and alkali metal hypochlorite.

* * * * *